United States Patent
Stoneback (12)

(10) Patent No.: US 10,016,867 B2
(45) Date of Patent: Jul. 10, 2018

(54) RETENTION KNOB FOR TOOL HOLDER

(71) Applicant: John Wayne Stoneback, Madison, OH (US)

(72) Inventor: John Wayne Stoneback, Madison, OH (US)

( * ) Notice: Subject to any disclaimer, the term of this patent is extended or adjusted under 35 U.S.C. 154(b) by 0 days.

(21) Appl. No.: 14/640,704

(22) Filed: Mar. 6, 2015

(65) Prior Publication Data

US 2015/0183071 A1    Jul. 2, 2015

Related U.S. Application Data

(63) Continuation of application No. 13/144,813, filed as application No. PCT/US2010/021192 on Jan. 15, 2010, now Pat. No. 8,998,545.

(51) Int. Cl.
   *B23B 3/12*   (2006.01)
   *B23Q 3/12*   (2006.01)
   *B23B 31/00*  (2006.01)

(52) U.S. Cl.
   CPC .............. *B23Q 3/12* (2013.01); *B23B 31/006* (2013.01); *B23B 2231/0296* (2013.01);
   (Continued)

(58) Field of Classification Search
   CPC .... B23B 2231/0296; B23B 2231/0204; B23B 31/006; B23Q 3/12; Y10T 409/30952;
   (Continued)

(56) References Cited

U.S. PATENT DOCUMENTS

| | | |
|---|---|---|
| 4,714,389 A | 12/1987 | Johne |
| 4,729,702 A | 3/1988 | Kelm |

(Continued)

FOREIGN PATENT DOCUMENTS

| | | |
|---|---|---|
| EP | 0317682 | 5/1989 |
| EP | 0988910 | 3/2000 |

(Continued)

OTHER PUBLICATIONS

PCT/US2010-021192 International Search Report & Written Opinion—dated Mar. 22, 2010.

(Continued)

*Primary Examiner* — Daniel Howell
*Assistant Examiner* — Paul M Janeski
(74) *Attorney, Agent, or Firm* — Tarolli, Sundheim, Covell & Tummino LLP

(57) ABSTRACT

A retention knob for use with a tool holder that is less prone to distorting a tapered tool holder surface, especially if it is over-tightened. The retention knob includes a knob head, a flange engageable with an end of a tool holder shank, a pilot segment receivable by the counter bore defined by said tool holder shank and a threaded segment spaced from said flange by an undercut segment. The threaded segment is configured so that it has a length that is substantially the minimum length required to achieve maximum thread holding strength. The undercut segment is configured to space the threaded segment from its head so that a distal end of the threaded segment is substantially near the bottom of the tapered bore forming part of the tool holder. With the disclosed construction, an upper portion of the threaded tool holder bore is not engaged by the threaded segment. The threaded segment has balanced threads which is achieved by locating the lead-in of the thread 180° from the lead-out of the thread. Chamfer angles at the lead-in and lead-out of the threaded segment are controlled to be the same or substantially similar.

10 Claims, 2 Drawing Sheets

(52) U.S. Cl.
CPC ........ *Y10T 29/49826* (2015.01); *Y10T 279/34* (2015.01); *Y10T 408/94* (2015.01); *Y10T 409/30952* (2015.01); *Y10T 409/303752* (2015.01); *Y10T 409/309408* (2015.01)

(58) Field of Classification Search
CPC ......... Y10T 409/303752; Y10T 279/34; Y10T 408/94; Y10T 409/309408; Y10T 29/49826
USPC ..... 409/234, 233, 231, 232, 230; 408/239 R, 408/239 A, 226, 238; 279/900; 411/366.3
See application file for complete search history.

(56) References Cited

U.S. PATENT DOCUMENTS

| | | | |
|---|---|---|---|
| 4,842,466 A | 6/1989 | Wheeler et al. | |
| 4,976,575 A | 12/1990 | Kappelhorf et al. | |
| 5,984,595 A | 11/1999 | Mizoguchi | |
| 6,224,306 B1 | 5/2001 | Hiroumi et al. | |
| 6,592,313 B2 | 7/2003 | Kohori | |
| 7,048,481 B2 | 5/2006 | Sugata et al. | |
| 7,144,210 B2 | 12/2006 | Massa et al. | |
| 7,284,938 B1 | 10/2007 | Miyazawa | |
| 7,563,062 B1 | 7/2009 | Chen | |
| 8,172,490 B2 | 5/2012 | Kretzschmann et al. | |
| 8,459,908 B2 | 6/2013 | Cook | |
| 2006/0089976 A1 | 4/2006 | Breihan et al. | |

FOREIGN PATENT DOCUMENTS

| | | |
|---|---|---|
| EP | 1316387 | 4/2003 |
| JP | 7-185983 A | 7/1995 |

OTHER PUBLICATIONS

Federal Standard H28/28, Screw-Thread Standards for Federal Services, Section 2, Unified Inch Screw Threads UN and UNR Thread forms Aug. 20, 1991—entire document.
Seegmiller H. Lee, Torquing Preload in a Lubricated Bolt, NASA Technical Memorandum 78501—Sep.5, 1978, entire document.
PCT/US2012/0021192 European Search Report and Written Opinion, completed May 28, 2015.

RETENTION KNOB FOR TOOL HOLDER

RELATED APPLICATION

This application is a continuation of application Ser. No. 13/144,813, filed Jul. 15, 2011, which is a 371 of PCT/US10/21192, Filed Jan. 15, 2010 which claims benefit of U.S. Provisional Patent Appln. Ser. No. 61/205,315, filed Jan. 16, 2009.

TECHNICAL FIELD

The present invention relates generally to machine tools and, in particular, to a retention knob for use with tool holders.

BACKGROUND ART

Machine tools, such as CNC machines, use a plurality of tools to produce a machined product. Cutting tools, such as end mills and drills, are automatically changed during a machining operation. The cutting tools are typically held in tool holders which are automatically installed and removed from machine spindles, as needed. In order to maintain precise tolerances, the tool holder must be rigidly held within the spindle. If relative movement occurs between the spindle and tool holder, machining errors will result and machining tolerances will be compromised.

A tool holder of the type to which this invention pertains, includes a tapered shank which is received in a complementary-shaped spindle socket. In order to maintain machine tolerances, it is critical that the tapered shank of the tool holder be in intimate and substantially full contact with the spindle socket. If the tool holder shank is not in full contact with the spindle socket, relative movement may occur, especially under heavy machining, which will produce wear in the tool holder shank or the spindle socket or both.

In the tool holder of the type to which this invention pertains, a retention knob is threadedly received by the shank. The retention knob is engaged by a spindle gripper and holds the tool holder within the spindle during the machining operation. It is has been found, that installation of the retention knob may create a distortion or enlargement in the tool holder shank. The distortion is usually increased if the retention knob is overtightened. This distortion may prevent the tool holder shank from fully engaging the spindle socket when the tool holder is installed. If the tool holder shank is not in full contact with the spindle socket, relative movement between the tool holder and socket may occur. This relative movement will decrease machine tolerances increase cutting tool wear and produce wear in the tool holder and/or spindle.

DISCLOSURE OF INVENTION

The present invention provides a new and improved retention knob for use with a tool holder. According to the invention, the retention knob includes a retention knob head which is engageable by a spindle forming part of a machine tool. Adjacent to the knob head is a pilot section that is receivable by a counter bore formed in the tool holder. A threaded segment is engageable by a threaded bore defined by the tool holder and is spaced a predetermined distance below the pilot section by an undercut segment. The undercut segment does not engage, nor does it apply forces to the threaded bore of the tool holder.

According to the invention, the threaded segment of the retention knob is selected to be the minimum length required for maximum thread strength. The threaded segment is also arranged so that its distal end is spaced away from an end of the threaded bore in the tool holder by a small amount to avoid interference between the distal end of the retention knob and the end of the threaded bore in the tool holder. In a more preferred embodiment, the length of the threaded segment and its spacing from the pilot section is arranged so that a clearance equal to one or two threads is established between the distal end of the retention knob and the end of the threaded bore in the tool holder when the retention knob is installed.

With the present invention, the retention knob does not threadedly engage the portion of the threaded bore that is located within the drive end of the tool holder (the end engaged by the draw bar) which has a much smaller diameter than the end of the tool holder that receives the cutting tool. It is has been discovered that, by avoiding threaded engagement between the retention knob and the narrower end of the tool shank, incidence of distortion or enlargement of the tapered surface of the tool holder is substantially reduced.

According to a feature of the invention, the threaded segment of the retention knob is balanced by controlling its length to insure that the lead-in and lead-out of the threads on the threaded segment are substantially 180° apart. To further enhance balancing of the retention knob, chamfer angles at the beginning and end of the threaded segment are preferably substantially the same.

With retention knobs of the present invention, distortions in the tapered surface of the tool holder are substantially reduced, thus resulting in better fit between the tool holder and the spindle of the machine tool. The absence of distortion in the tapered surface results in longer tool holder life and better machining. The improved retention knob of the present invention is less likely to "wobble" within the spindle during machining operations, and, thus, machining tolerances are improved and tool wear is reduced. It has also been found that power consumption by the spindle drive motors may be reduced.

According to the invention, it is desirable that the threaded bore in the tool holder that receives the retention knob be, formed deeper in the tool holder so that the threaded segment of the retention knob is spaced further from the drive end or narrow diameter end of the tool holder shank. The deeper the threaded segment of the retention knob is positioned, the less chance of creating distortion or enlargement in the critical tapered surface of the shank of the tool holder.

Additional features of the invention will become apparent and a fuller understanding obtained by reading the following detailed description made in connection with the accompanying drawings.

BEST MODE FOR CARRYING OUT THE INVENTION

Figure 1:
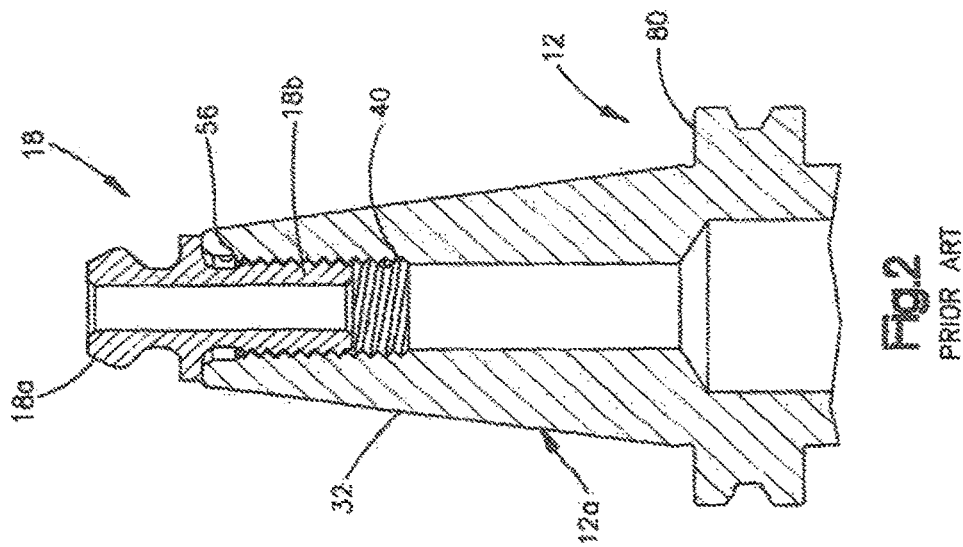
FIG. 1 is a fragmentary view of a machine tool spindle showing how a tool holder is held in operative engagement with the spindle.

FIG. 1 illustrates a tool holder 12 and a spindle 14 with which the tool holder 12 is used. As is known, the tool holder 12 is used to mount replaceable machining tools such as cutters, drills, mills etc., in a machine tool such as a CNC machine. As seen in FIG. 1, the tool holder 12 is removably held in a spindle indicated generally by the reference 14 which forms part of the CNC machine. The tool holder includes a retention knob 18, which is generally threadably received in a bore formed in a shank 12a of the tool holder 12. The spindle 14 includes a gripper mechanism indicated generally by the reference character 20, which includes grippers 24 that are operative to grip a head 18a of the retention knob 18. The gripper assembly 20 draws the shank 12a of the tool holder 12 into the spindle 14 and rigidly couples the tool holder 12 to the spindle 14 such that rotation of the spindle causes rotation in the tool holder, and hence the machining tool (not shown) carried by the tool holder 12. The tool holder 12 is maintained in its operative position inside the spindle 14 by a spring or spring mechanism indicated generally by the reference character 30.

As seen in FIG. 1, the tool holder shank 12a includes a frustum-shaped or tapered mounting surface 32 that confrontingly engages a complementary shaped spindle bore or socket 34. The angle of the taper on the shank 12 is an industry standard. It should be noted, that several sized tapers are used in the industry. In the illustrated embodiment, the angle of the taper is 8.29714 degrees per side. This is also referred to as a 3.500" taper per foot, or 7/24 step taper or 8° 17' 49.7" per side.

In order to provide precise machine intolerances, it is critical that the tapered surface 32 of the tool shank 12a have full contact with the tapered surface defined by the spindle socket 34. If full contact is not established, relative movement between the tool holder 12 and spindle 14 will occur, especially under heavy machining loads. This movement will produce machining errors and, thus, machine tolerances will not be maintained. It will also cause wear in the tool shank 12 and spindle 14 and reduce the life of the cutting tool.

Figure 3:
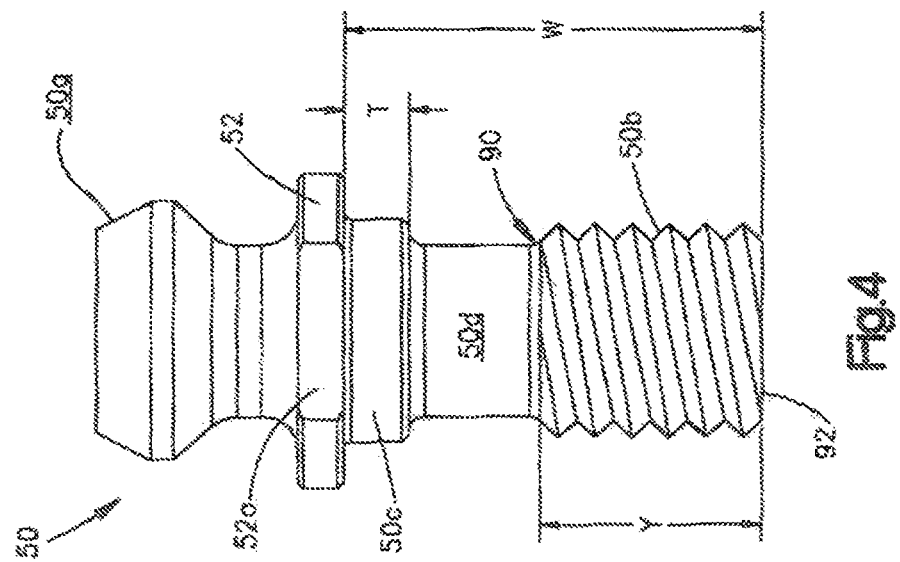
FIG. 3 is a fragmentary view of a conventional tool holder with a retention knob constructed in accordance with a preferred embodiment of the invention.

As indicated above, the tool holder 12 includes a replaceable retention knob 18 by which the tool holder 12 is held in the spindle 14, as seen in FIG. 3. The retention knob 18 is threaded into a threaded bore 40 defined by the tool holder shank 12a. It is generally recommended, that the retention knob 18 be installed in the tool holder 12 with a specific torque. It has been discovered that a conventional retention knob can produce a distortion or a diametral enlargement in the tool holder shank 12a, which, in particular, distorts its conical surface 32. This distortion can be further increased if the retention knob is over-torqued.

The threaded bore 40 has a predetermined length that is determined by the standard to which the tool holder 12 has been made. For example, a tool holder 12 made to an ANSI specification has a predetermined configuration including the degree of taper of the conical surface 12a, the length of the threaded bore 40, the diameter of the threaded bore 40 and the thread pitch with which it is threaded. Similarly, the retention knob 18 intended for the particular tool holder is also made to a specification which included its overall length, the position and length of a threaded segment 18b, as well as a configuration of a retention knob head 18a, by which it is gripped by the spindle.

As indicated above, it has been found that conventional retention knobs made to existing specifications can produce a distortion in the tool holder shank 12a especially if not properly installed (i.e., over-torqued). Any distortion in the shank 12a or in the tapered surface 32 can produce machining errors and/or wear in the spindle, tool holder or cutting tool itself.

FIG. 3 illustrates a new and improved retention knob 50 that is intended to be used with conventional tool holders 12. The knob 50 is less prone to producing distortions in the conical surface 32 of the tool holder 12 even when over-torqued. In addition the improved retention knob 50 provides a more secure coupling between itself and the tool holder 12 resulting in less relative movement between the retention knob 50 and the tool holder 12 during machining operations. As a result, with the illustrated retention knob, tool holder, cutting tool and retention knob life is improved, while maintaining close machining tolerances.

Figure 4:
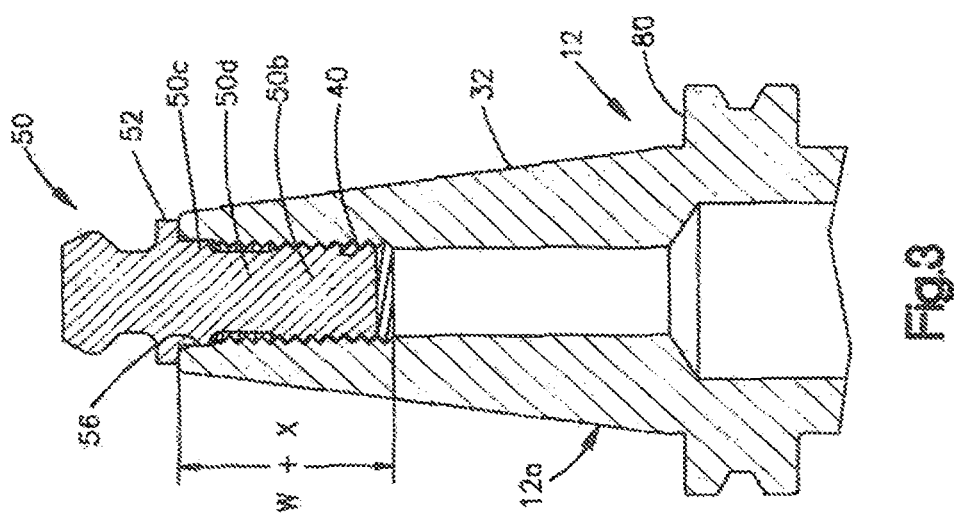
FIG. 4 is an elevational view of a retention knob constructed in accordance with a preferred embodiment of the invention.

Referring also to FIG. 4, the retention knob 50 includes a retention knob head 50a which is preferably configured to a machining standard such as an ANSI standard. The head includes an integrally formed flange 52 which abuts the upper end (as viewed in FIG. 3) of the tool holder shank 12a when it is fully installed. The flange 52 includes a pair of flats 52a (only one is shown), by which the retention knob 50 is engaged by a suitable tool for installation and removal. The retention knob 50 also includes a threaded segment 50b spaced a predetermined distance below the flange 52.

Figure 2:
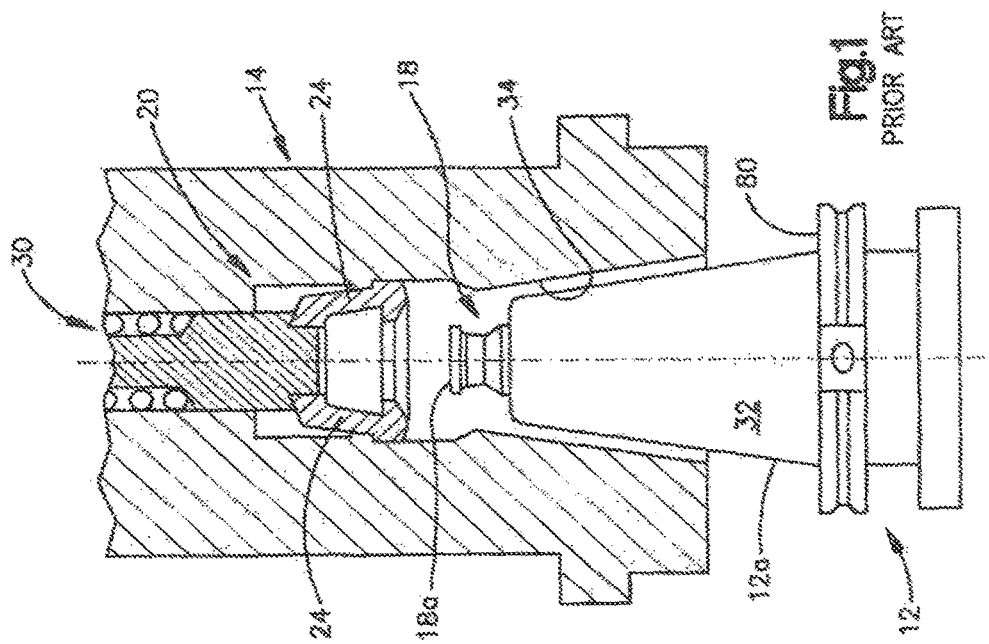
FIG. 2 illustrates a tool holder with a conventional retention knob.

According to a feature of the invention, the retention knob 50 includes a pilot segment 50c just below the flange 52. As seen in FIG. 3, the pilot segment 50c is intended to fit within a counter bore 56 that forms part of the conventional tool holder 12. The threaded segment 50b of the retention knob 50 is spaced from the pilot segment 50c by an undercut 50d. It is believed that the use of the undercut decreases the chances of the retention knob 50 distorting the conical surface 32 when the retention knob 50 is installed in the tool holder 12 even when it is over-torqued. The undercut is designed, as will be explained below, to cause the threaded segment 50b to be spaced downwardly as compared to a conventional retention knob 18 for the same application while not decreasing its holding strength within the bore 50. In other words, although the length of the thread segment 50b is less than the length of the threaded segment 18b shown in FIG. 2 (and called for in the current retention knob specifications), the amount of force required to produce failure in the threaded engagement between the retention knob and the tool holder is not decreased.

As seen in FIG. 4, the retention knob 50 has dimensions "T", "Y" and "W". The dimensions for a particular application are determined in accordance with the invention as follows. The specifications for the tool holder for which the retention knob 50 is intended is reviewed/consulted to determine the depth of the threaded bore 40 of the tool holder. The depth of the threaded bore 40 determines the dimension "W". The dimension "W" is typically selected to be less than the specified length of the threaded bore 40 so that clearance is provided between the bottom (as viewed in FIG. 4) or distal end of the retention knob and the bottom of the threaded bore 40. This clearance may be equivalent to one or two threads as shown in FIG. 3. As seen in FIG. 3, the total length of the threaded bore 40 is "W"+"X" with "X" being the desired clearance between the bottom of the retention knob 50 and the bottom of the threaded bore 40.

The minimum length of the threaded segment "Y" is then calculated to be the minimum thread length that would produce the maximum holding strength for the thread. This is a known calculation and can be obtained by reviewing machining handbooks. It should be noted that the length of the threaded segment 50b is also affected by the type of thread and materials used for both the tool holder and the retention knob. Appendix 1 illustrates known methods for calculating the appropriate thread length. Specifications from ISO 898, Part 1, (FED-STD-H28/2B 1991) can also be consulted.

The depth dimension "T" for the pilot section 50c is determined by the counter bore 56 that forms part of the tool holder. As indicated above, the dimensions for the counter bore 56 are determined by known standards and specifications. The diameter and length "T" of the pilot section is thus selected so that when the retention knob 50 is installed, the pilot section 50c fits within the counter bore 56 without inhibiting torquing of the retention knob to its specific torque. Once the dimensions "T", "W", and "Y" are established, the length of the undercut section 50d is determined and is equal to the difference between the "W" dimension and the total of the "T" and "W" dimensions.

As seen in FIG. 3, with the configuration shown in FIG. 4, the threaded segment of the retention knob 50 is located lower in the threaded bore 40 and a threaded engagement is absent between the retention knob and upper portions of the threaded bore 40 due to the undercut 50d. This configuration reduces the potential for distortion in the upper regions of the tool holder 12 when a retention knob is installed, especially if it is over-torqued.

According to a feature of the invention, a retention knob 50 is configured to be balanced so that a separate balancing step is not required during manufacture. To achieve this feature, the threaded segment 50b is configured so that a lead-in for the thread indicated by the reference character 90 is located 180° from a lead-out indicated generally by the reference character 92. To achieve this feature, the dimension "Y" may be increased so that the lead-in and lead-out points of the thread are 180° apart. In actual practice, it is contemplated that the length "Y" of the threaded segment 50b may be increased by one turn may result in a length "Y" that is slightly larger than a theoretical or calculated length. With this feature, the retention knob 50 has "balanced" threads.

To further promote balancing of the threads, the present invention also contemplates control of the "chamfer" angle at the beginning and end of the threaded segment 50b. In order to insure balance, it is important that the chamfer angles where the thread begins on the threaded segment 50b is the same or substantially similar to the chamfer angle at the end of the threaded segment 50b. This will insure that the material that defines the thread at the lead-in and lead-out of the threaded segment is substantially the same and, hence, does not affect the balance of the retention knob. It is believed that to further insure balance of the threads, that the lead-in 90 and lead-out 92 of the threads be spaced 180° apart plus or minus 1°. To further insure balance, the shape and location of the flats 52a must also be carefully controlled so they are spaced precisely symmetrically about the centerline of the retention knob. By carefully controlling the above parameters, a retention knob can be produced that is balanced without the need for a separate machining step to balance the retention knob 50.

The above discussed method can be used to configure a retention knob in accordance with the invention for tool holders of virtually any specification. Table 1 contains a table that illustrates the dimension of a retention knob constructed in accordance with the preferred embodiment of the invention for a plurality of industry standard tool holders with industry standard taper sizes. The dimensions for a retention knob for use with other tool holders not listed in Table 1, can be developed using the above described inventive method.

As discussed above, installation of a retention knob can produce distortion in the tapered surface 32 of the tool holder shank 12a, especially if over-torqued. A test gauge for determining the extent of distortion, if any, in a tool holder produced by the installation of a retention knob is disclosed in a U.S. patent application Ser. No. 61/145,353 and is hereby incorporated by reference. Appendix 2 includes drawings showing the test gauge 12 mounted on a tool holder 12.

To further enhance the performance of a retention knob constructed in accordance with this invention, it is recommended that it be torqued properly. For bolts in general, it is normally recommended that the induced stress in the bolt not be allowed to exceed 80% of the yield strength. It has been found that the retention knob can be considered a bolt and, as a consequence, the torque, to which it should be tightened to the shank of the tool holder, is governed by the following principles. In particular, the mathematical relationship between torque applied and the resulting tension force in the retention knob has been determined to be as follows:

$$T = 0.2 \times D \times F$$

where T is the torque required; D is the nominal bolt diameter (major diameter of the threaded segment of the retention knob) and F is the bolt tension desired (axial loading). For this application, the bolt tension desired is the draw bar force of the machine tool that holds the tool holder in position. For machine tool applications, the calculated torque is multiplied by 1.2 so that there is a 20% safety factor. Using these mathematical relationships, one can arrive at the proper tightening torque for a given retention knob based on the major diameter of this threaded segment 506 and the draw bar force in the machine in which the retention knob is to be used. TABLE 2 displays recommended tightening torques for retention knobs installed in four different tool holders and at various drawbar forces based on the above discussed relationships Although the invention has been described with a certain degree of particularity, those skilled in the art can make various changes to it without departing from the spirit or scope of the invention as hereinafter claimed.

The invention claimed is:

1. A retention knob for use with a tool holder, comprising:
   a) structure defining a retention knob head engageable by a spindle forming part of a machine tool and a retention knob flange abutably engageable with a driven end of a tool holder;
   b) a tool holder engagement member extending from said head and adapted to be received within a threaded bore formed in the tool holder;
   c) said engagement member including a uniform diameter threaded segment engageable by said threaded bore defined in said tool holder, said threaded segment spaced a predetermined distance from said retention knob head, said engagement member including an undercut segment between said threaded segment and said retention knob head;
   d) said threaded segment having a single thread with a single lead-in that is spaced axially from a single lead-out and are substantially 180° apart when viewed in a rotational plane, whereby said threaded segment is balanced and selected to have a length that is substantially equal to the minimum length required for maximum thread strength and said threaded segment being spaced from said retention knob head by said undercut segment selected to have a length such that a distal end of said threaded segment is spaced away from an end of said threaded bore in said tool holder a predetermined minimum distance that is substantially equal to two threads or less of said threaded bore that operates to avoid binding between the distal end of said retention knob and the end of said threaded bore.

2. The retention knob of claim 1 further including a pilot section adjacent said retention knob head, said pilot section being receivable by a counter bore in said tool holder.

3. The retention knob of claim 1 wherein the length of said threaded segment is determined at least partially by the formula $2 \times At/[3.14159/2 \times (\text{diameter} - 0.64952 \times p)]$; where At is the tensile stress area and p is the thread pitch.

4. A method for reducing distortions in a conical surface of a tool holder shank, the shank having a threaded bore for receiving a retention knob comprising the steps of:
   a) providing a retention knob having a retention knob flange abutably engageable with a driven end of a tool holder and a threaded segment having a uniform diameter and located a spaced distance from a driven end of said tool holder when the retention knob is installed, said threaded segment having a single thread with a single lead-in that is spaced axially from a single lead-out and are substantially 180° apart when viewed in a rotational plane, whereby said threaded segment is balanced;
   b) selecting a length for said threaded segment that is the minimum length needed for maximum thread strength;
   c) spacing said threaded segment from a retention knob head by an undercut segment that does not apply forces to the tool holder bore when the retention knob is installed;
   d) tightening said retention knob to a predetermined torque that is at least partially determined by the relationship $0.2 \times D \times F$, where D is the major diameter of the threaded segment and F is the bolt tension desired;
   e) spacing a distal end of said threaded segment from an end of said threaded bore a predetermined minimum distance extending the length of said undercut segment such that binding between said distal end of said threaded segment and said threaded bore is avoided, said predetermined minimum distance is substantially equal to two threads or less of the threaded bore.

5. The method of claim 4 further comprising the step of providing a pilot section adjacent said retention knob head that is receivable by a counter bore formed in said tool holder.

6. The method of claim 4 further comprising the step of increasing the depth of said threaded bore in said tool holder so that said threaded segment of said retention knob can be spaced further from said retention knob head.

7. The method of claim 4 wherein said threaded segment is balanced by controlling said length to insure that the single lead-in and the single lead-out of said threads on said threaded segment are substantially 180° apart when viewed in a plane orthogonal to an axis of rotation of said retention knob.

8. A retention knob for use with a tool holder, comprising:
   a) structure defining a retention knob head engageable by a spindle forming part of a machine tool and a retention knob flange abutably engageable with a driven end of a tool holder;
   b) a tool holder engagement member extending from said head and adapted to be received within a threaded bore formed in the tool holder;
   c) said engagement member including a threaded segment engageable by said threaded bore defined in said tool holder, said threaded segment spaced a predetermined distance from said retention knob head, said engagement member including an undercut segment between said threaded segment and said retention knob head;
   d) said threaded segment selected to have a length that is substantially equal to the minimum length required for maximum thread strength and said threaded segment being spaced from said retention knob head such that a distal end of said threaded segment is spaced away from an end of said threaded bore in said tool holder a distance that is substantially equal to two threads or less of said threaded bore to avoid binding between the distal end of said retention knob and the end of said threaded bore;
   e) said undercut segment arranged such that it does not apply forces to said tool holder, when said retention knob is installed and having a single thread with a single lead-in that is spaced axially from a single lead-out and are substantially 180° apart when viewed in a rotational plane, whereby said threaded segment is balanced.

9. The retention knob of claim 8 further including a pilot section adjacent said retention knob head, said pilot section being receivable by a counter bore in said tool holder.

10. The retention knob of claim 8 wherein the length of said threaded segment is determined at least partially by the formula $2 \times At/[3.14159/2 \times (\text{diameter} - 0.64952 \times p)]$; where At is the tensile stress area and p is the thread pitch.

* * * * *

UNITED STATES PATENT AND TRADEMARK OFFICE
CERTIFICATE OF CORRECTION

PATENT NO. : 10,016,867 B2
APPLICATION NO. : 14/640704
DATED : July 10, 2018
INVENTOR(S) : John W. Stoneback Page 1 of 1

It is certified that error appears in the above-identified patent and that said Letters Patent is hereby corrected as shown below:

In the Claims

Column 7, Line 46 reads "distance extending" should read --distance by extending--

Signed and Sealed this
Twenty-first Day of August, 2018

Andrei Iancu
*Director of the United States Patent and Trademark Office*